US012236212B1

United States Patent
Ismail et al.

(10) Patent No.: US 12,236,212 B1
(45) Date of Patent: Feb. 25, 2025

(54) PROVIDER-DEFINED FUNCTIONS FOR AN INFRASTRUCTURE-AS-CODE WORKFLOW

(71) Applicant: HashiCorp, San Francisco, CA (US)

(72) Inventors: Omar Ismail, San Francisco, CA (US); Brian Flad, San Francisco, CA (US); James Bardin, San Francisco, CA (US)

(73) Assignee: HashiCorp, San Francisco, CA (US)

( * ) Notice: Subject to any disclaimer, the term of this patent is extended or adjusted under 35 U.S.C. 154(b) by 0 days.

(21) Appl. No.: 18/634,557

(22) Filed: Apr. 12, 2024

(51) Int. Cl.
*G06F 8/30* (2018.01)
(52) U.S. Cl.
CPC ..................... *G06F 8/31* (2013.01)
(58) Field of Classification Search
None
See application file for complete search history.

(56) References Cited

U.S. PATENT DOCUMENTS

| | | | | |
|---|---|---|---|---|
| 11,947,946 | B1* | 4/2024 | Rao | G06F 21/577 |
| 2019/0079751 | A1* | 3/2019 | Foskett | G06F 9/5011 |
| 2020/0059420 | A1* | 2/2020 | Abraham | H04L 41/12 |
| 2022/0086055 | A1* | 3/2022 | Aftab | H04L 41/145 |
| 2022/0191168 | A1* | 6/2022 | Snehashis | H04L 41/22 |
| 2022/0229637 | A1* | 7/2022 | Benassi | G06F 8/315 |
| 2023/0037199 | A1* | 2/2023 | Holzman | H04L 41/0843 |

OTHER PUBLICATIONS

Guerriero et al., "Adoption, Support, and Challenges of Infrastructure-as-Code: Insights from Industry," IEEE, 2019, 10pg. (Year: 2019).*
Brady et al., "Smart RPC-Based Computing in Grids and on Clouds, " Wiley, 2014, 35pg. (Year: 2014).*
Lampesberger, Harald, "Technologies for Web and cloud service interaction: a survey," Springer, 2014, 40pg. (Year: 2014).*

* cited by examiner

*Primary Examiner* — Ryan D. Coyer
(74) *Attorney, Agent, or Firm* — FisherBroyles LLP; James P. Cleary

(57) ABSTRACT

A computing infrastructure configuration system and method include an infrastructure-as-code configuration tool providing a configuration language that defines the configuration and operation of the computing infrastructure using a declarative syntax. The declarative syntax is configured to express a plurality of built-in functions that can be executed by the computing infrastructure based on the configuration of the computing infrastructure. The system and method further include a syntax extension from the declarative syntax that expresses one or more provider-defined functions defined by one or more providers, and connected to the configuration tool by a provider protocol, the provider protocol providing the syntax extension to invoke the one or more provider-defined functions via the configuration language to enable the computing infrastructure to call at least one of the one or more of the provider-defined functions for execution by the computing infrastructure.

21 Claims, 3 Drawing Sheets

PROVIDER-DEFINED FUNCTIONS FOR AN INFRASTRUCTURE-AS-CODE WORKFLOW

TECHNICAL FIELD

The subject matter described herein relates to cloud computing infrastructure provisioning, and more particularly to infrastructure-as-code to enable provider-defined functions.

BACKGROUND

An infrastructure-as-code (IaC) software tool such as Terraform by HashiCorp®, manages external resources, such as public and private cloud infrastructure, networking and communication appliances, and other computing resources, in concert with "providers" of those resources. As that term is used herein, "provider" refers to a plug-in or extension to the IaC tool that enables interaction with an API to execute any number of functions and/or to manage resources. Each provider adds a set of resource types and/or data sources to be managed by Terraform. Each resource type is implemented by a provider. Providers configure a specific infrastructure platform, either with cloud infrastructure, self-hosted, or a combination of both. As the term is used herein, a "provisioner" is something that executes an action when a resource is provisioned. In an IaC tool such as Terraform, there are currently only three types of provisioners supported: local-exec; remote-exec; and file. Providers are the generic extension point for Terraform, providing managed resources, data sources, functions, and possibly other future abilities.

Terraform uses a proprietary configuration language, an implementation of HashiCorp Configuration Language (HCL), that enables practitioners to define their intentions via a declarative syntax, which Terraform transforms into a directed acyclic graph of operations. Terraform's configuration language implements all the functions necessary for structuring a configuration via blocks, attributes (which contain values), and expressions (which reference other values in a configuration), and combine them. The configuration language can also include function calls to a number of functions to be executed by the infrastructure, which functions perform a variety of routine tasks including numeric calculations, string manipulations, collection transformations, and other operations. Presently, any functions callable by the configuration language are established as built-in functions, i.e., pre-defined and part of the configuration language structure.

By way of example, HCL defines a built-in function call as an expression with the syntax of <NAME>(<ARGUMENT 1>[ , <ARGUMENT #> . . . ]) with a single value result. Function arguments and their result must statically define their type constraints upfront. Thus, built-in functions are defined in the top level namespace within the core configuration language.

Logic that can be expressed by existing built-in functions can use existing configuration language features. Practitioners working within the context of a single value in a single configuration may opt to directly combine any necessary logic into a single expression. If that value is necessary elsewhere in the same configuration, they may opt to use a local value for easier referencing. When the combined logic becomes difficult to comprehend, practitioners may then decide to split the expression into multiple local values, each representing a logical step. If the logic is necessary in multiple configurations, it may be bundled into its own module, which may need to be published in a registry. At this stage, while it is technically possible to achieve the desired goal of accessing a provider-defined function apart from the built-in functions, it is quite complex as it requires duplicate logic across individual configurations, increasing their maintenance burden.

In another example, a non-trivial expression of multiple, chained function calls can be written using local values. Other, potentially more difficult configuration expressions exist where practitioners perform manual math operations and generally add comments to clarify the intended configuration. These include, but are not limited to, time durations and computer storage capacities which require varying units across the ecosystem.

Any configuration logic that cannot be expressed by built-in functions is to be performed by or through provisioners and through provider plugins. Provisioners can execute arbitrary commands, however their usage is discouraged. Therefore, providers are the only execution environment that can reliably support external functions by running arbitrary programming language code, calling commands, or making networking requests if there is a remote service which can perform the logic of a desired function.

To that end, over seventy five community providers solely exist in a public registry 10, depicted in FIG. 1, with at least one data source that acts similar to a function. Many practitioners also rely on community and official provider functionality such as an external data source, which offer a generic escape hatch for gaps in configuration language functionality. These solutions, while also technically possible to achieve the desired goal, are just as verbose in terms of necessary configuration and sometimes very difficult to comprehend.

Users and providers continually seek more functions or enhancements to existing functions. These requests include, but are not limited to, functions related to data transformation, hashing, string templating, and time conversion. However, scaling these additional functions within a single language namespace and to the customization degree that practitioners desire is presently untenable within a core configuration language. Many of these, while generic in nature and could be considered suitable for inclusion in the core configuration language, may have competing implementations that are difficult to reconcile within a single namespace. For example, one popular request is a function that supports deep merging of maps and/or objects. However, there are multiple possible implementations of this type of deep merging, each with their own valid use cases. Therefore, implementing these types of provider-defined functions is difficult within the core language.

There is thus a need for extensibility in an IaC tool such as Terraform to implement provider-defined functions.

SUMMARY

This document describes a system and method for building provider-defined functions and extending that capability across other IaC capabilities. Using an existing provider plugin model, providers can declare their own functions, which practitioners can include in their configuration similar to built-in functions.

In some aspects, a new syntax is introduced for calling functions within a provider via the IaC tool, for expanding the provider protocol to enable provider functions. The system and method described herein provides out-of-the-box support for providers such as aws, azure, gcp, and utility providers, and ensure provider-defined functions work seamlessly with the checks and/or validation processes and testing features of the IaC tool and resultant platform. Provider-defined functions are designed to be easily incorporated into future Terraform constructs and workflows, i.e. Stacks, or Terraform Actions. Further, the system and method described herein expands provider function support in the IaC tool editors, such as VS Code Extension and Language Server, for example.

In one particular aspect, a computing infrastructure configuration system includes an infrastructure-as-code configuration tool providing a configuration language that defines the configuration and operation of the computing infrastructure using a declarative syntax. The declarative syntax is configured to express a plurality of built-in functions that can be executed by the computing infrastructure based on the configuration of the computing infrastructure. The system further includes a syntax extension from the declarative syntax that expresses one or more provider-defined functions defined by one or more providers, and connected to the configuration tool by a provider protocol, the provider protocol providing the syntax extension to invoke the one or more provider-defined functions via the configuration language to enable the computing infrastructure to call at least one of the one or more of the provider-defined functions for execution by the computing infrastructure.

In another aspect, a method, performed by an infrastructure-as-code configuration tool, for configuring a computing infrastructure is disclosed. The method includes providing a declarative syntax configured to express a plurality of built-in functions that can be executed by the computing infrastructure based on a configuration of the computing infrastructure. The method further includes providing a syntax extension from the declarative syntax. The syntax extension is configured to express one or more provider-defined functions defined by one or more providers, each of the one or more providers connected to the configuration tool by a provider protocol. The provider protocol provides the syntax extension to invoke the one or more provider-defined functions via the configuration language to enable the computing infrastructure to call at least one of the one or more of the provider-defined functions for execution by the computing infrastructure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a system and method to enable provider-defined functions in an IaC tool, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes a system and method for building provider-defined functions and extending that capability across other IaC tool capabilities. Using a provider plugin to an IaC tool, providers can implement their own functions in their preferred programming or communication language they use to communicate over the provider plugin protocol, declare which functions can be invoked, and which can be included in their configuration similar to existing declared, built-in functions.

To accomplish allowing provider-defined functions in addition to built-in functions, the provider plugin protocol is enhanced with a number of Remote Procedure Calls (RPCs) and function-handling updates.

Function RPCs: Implementations of the configuration system adds several function RPCs, described in further detail below, to retrieve function definitions, separate from a GetProviderSchema RPC, and to call function logic defined in the provider.

Diagnostics: Adds an optional new field which core can use to align configuration source with a specific function argument, rather than the function call as a whole.

Other added RPCs include: a GetProviderSchema RPC, which adds function metadata for legacy core codepaths; and a GetMetadata RPC, which adds function metadata for terraform-plugin-mux.

In some implementations, the configuration language provides a syntax to declaratively express the invocation of provider-defined functions. The provider plugin protocol is configured to allow providers to define and invoke one or more provider-defined functions. The IaC tool is configured to parse the configuration language for function calls, and to perform validation of those functions being called. These validations can include determining whether the functions exist, whether the functions have appropriate input variables, and whether the input/output types are appropriate.

Accordingly, the IaC tool is configured to invoke the provider protocol at the appropriate times to query providers for any supported functions when evaluating the configuration, and to invoke provider-defined functions at an appropriate time, such as at the time of refresh, plan, and/or apply execution of the configuration. Documentation about the provider-defined functions is presented in a registry, based on declarations from the provider protocol. The documentation can include function name, inputs, outputs, and examples of usage, among other descriptions.

Figure 1:
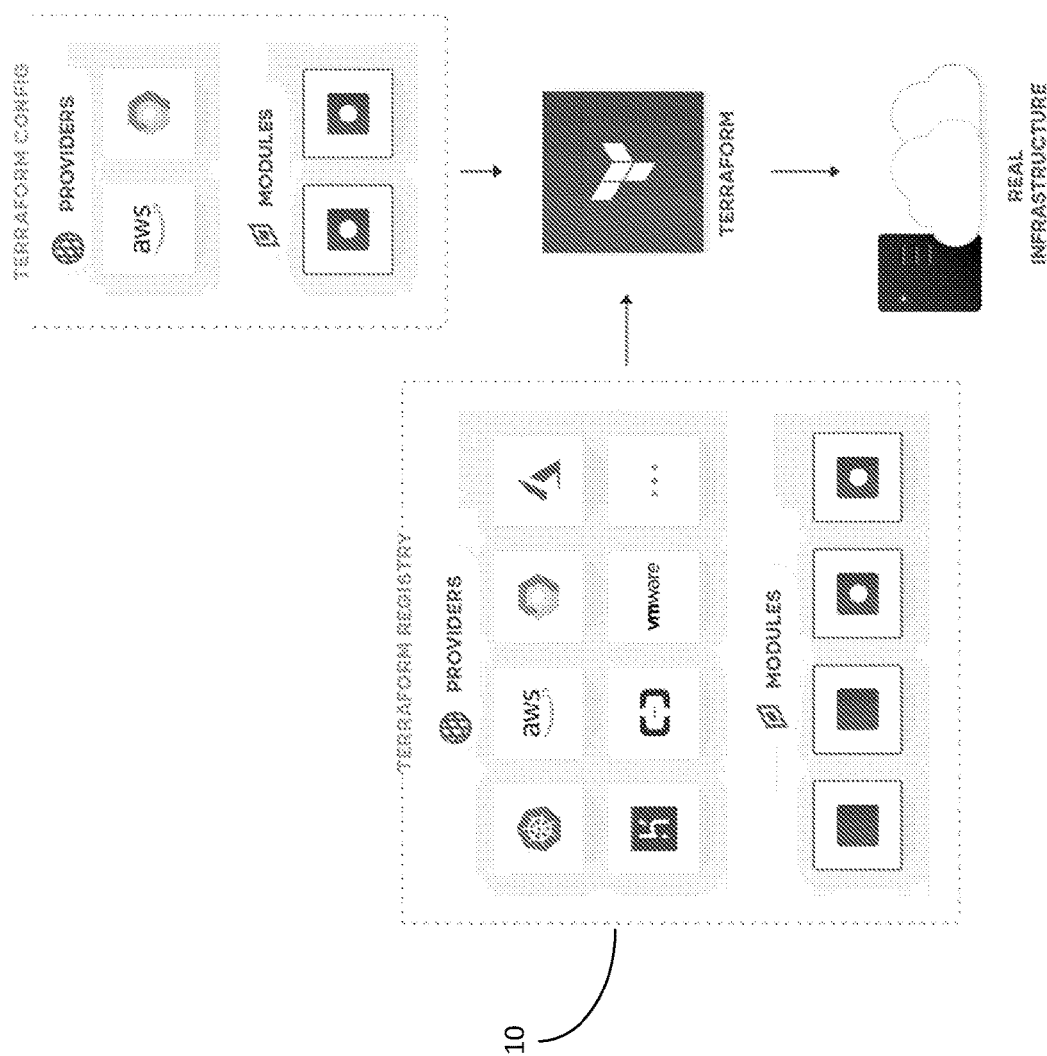
FIG. 1 shows a registry of a computing infrastructure configuration system.
Figure 2:
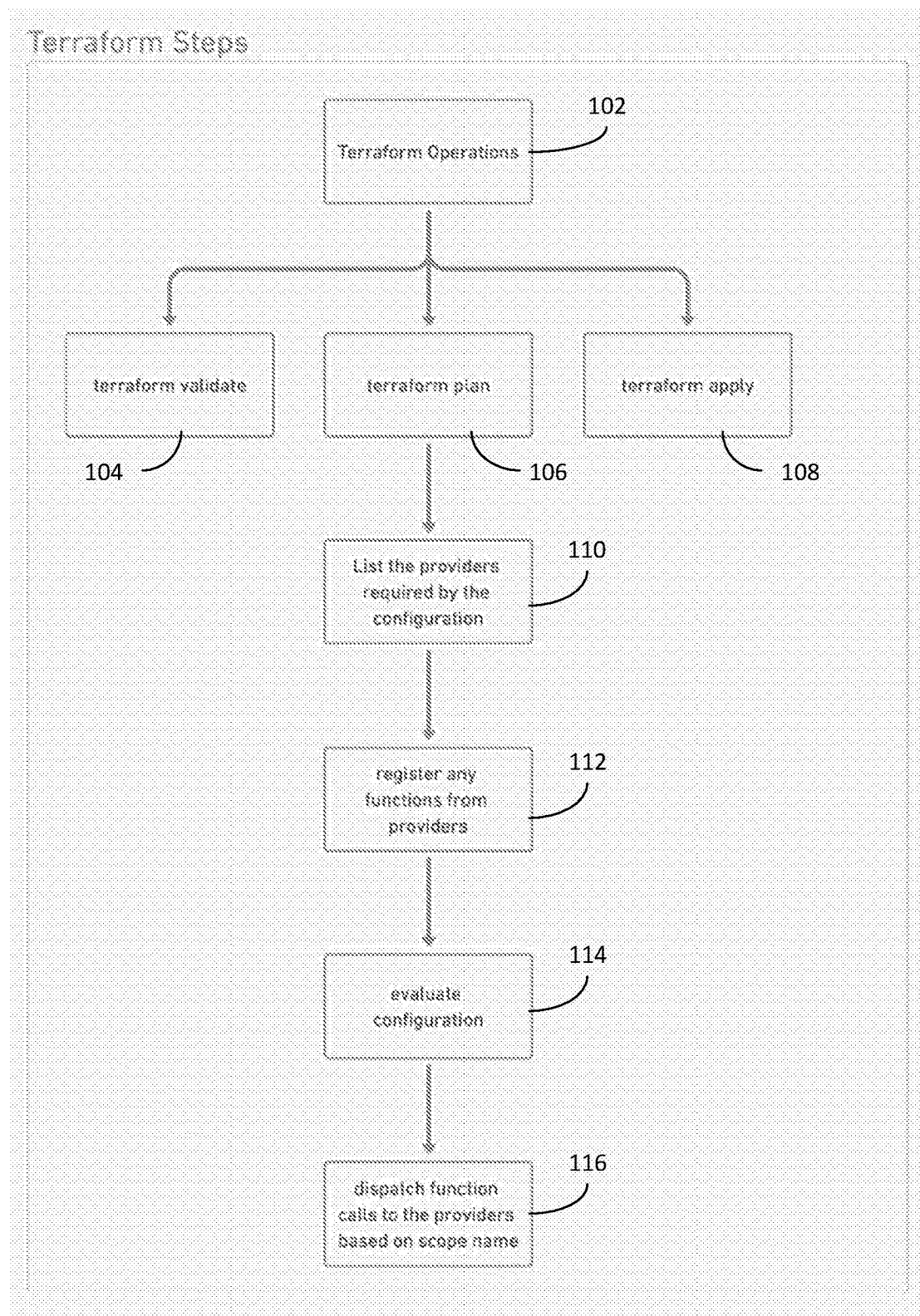
FIG. 2 is a process flow diagram illustrating aspects of a method having one or more features consistent with implementations of the current subject matter.
Figure 3:
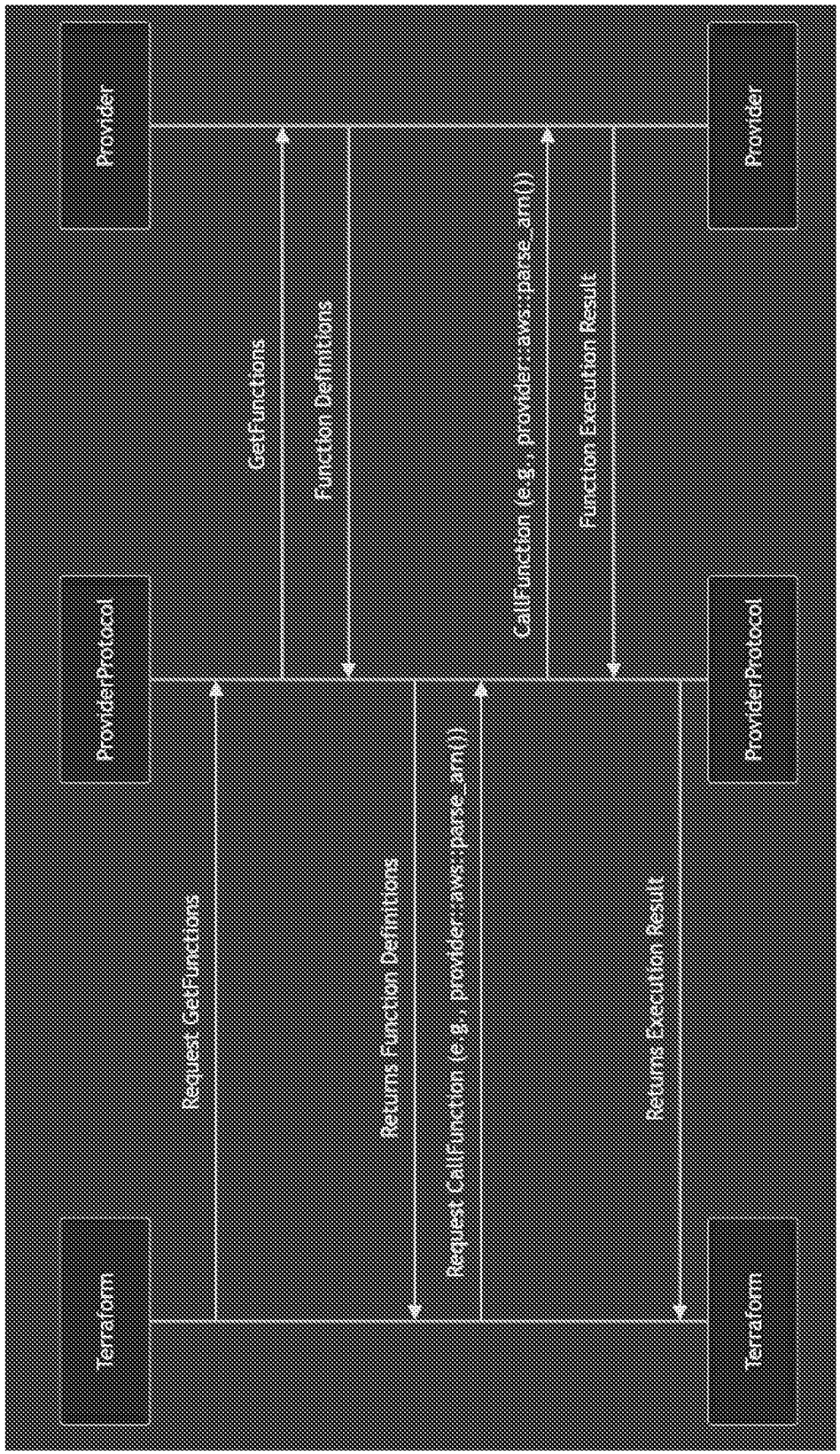
FIG. 3 illustrates aspects of a computing infrastructure configuration system showing features and operations consistent with implementations of the current subject matter.

As shown in FIG. 2, a system and method in accordance with the disclosure herein introduces a new syntax for calling provider functions. This new syntax hooks into the protocol changes that are developed to enable provider functions, as well as any additional tooling/library changes to make it easy for provider authors to write and test their own functions. The system and method enable providers to declare functions and the core functionality to handle those functions and provide practitioner ability to discover those functions. Once the configuration language and providers enable support for provider-defined functions, a CDK for the IaC tool can be extended to enable this capability in other programming languages.

Referring again to FIG. 2, which illustrates an IaC tool 100 for configuring computing infrastructure, and where the components of the infrastructure such as cloud infrastructure (servers, networking equipment, applications, software integration tools, etc.), the IaC tool includes operations 102 to configure an infrastructure, as supported by the processes of validation 104, planning 106 and applying 108 the infrastructure configuration. As part of the IaC, a system and method include listing, at 110, the providers required by the configuration. At 112, any functions from the providers are registered with the IaC tool, which evaluates the configuration at 114. At 116, the IaC tool 100 dispatches function calls to the providers based on a scope name of the provider-defined function.

The new, expanded function calling syntax in the configuration language is broadly: [NAMESPACE: :]FUNCTION_NAME([ARG [, ARG]*]). The new provider-defined functions use the provider: :PROVIDER_TYPE namespace. Existing built-in functions in the configuration language can still be called without the namespace for backwards compatibility, although they also support the core namespace. In preferred implementations, function names and the new function namespace syntax support a very broad set of characters based on Unicode Standard Annex (UAX).

Function arguments have a broad set of potential syntax due to the amount of existing language features, so they can also be omitted. The following is an example of the expanded function-calling syntax:

identifier = (identifier_start | "_" ) , { identifier_continue | "-" } ; expression = (literal | reference | function call | more ) ; provider type = identifier ; function name = identifier ; function argument = expression ; namespace separator = ": :" ; provider namespace = "provider" , namespace separator , provider type ; core namespace = "core" ; function call = ([ core namespace , namespace separator] | (provider namespace , namespace separator ) ), function name , "(", [ function argument , [ { ("," , function argument )} ] ] , ")" ;

Function arguments are technically just an "expression" in the language, and which include literals, references, and some other language features that distill down to a data value. Each added expression is independent, with its own added literals, references, function calls, and delineated function arguments.

In accordance with preferred implementations, a new GetFunctions RPC is added, by which providers can announce to the core their supported functions, using a definition that includes a name, parameters, and return. Further in accordance with preferred implementations, a new CallFunction RPC is added, by which the core uses the provider to run the associated functional logic by passing argument data from the configuration (according to the function definition) and expects the provider to respond with a result value of the correct type (again, according to the function definition) or any errors.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computing infrastructure configuration system comprising:
   an infrastructure-as-code configuration tool providing a configuration language that declaratively defines the configuration and operation of the computing infrastructure, the configuration language providing a syntax to declaratively express a plurality of built-in functions that can be executed by the computing infrastructure based on the configuration of the computing infrastructure; and
   one or more provider-defined functions defined by one or more providers, each of the one or more providers connected to the configuration tool by a provider protocol, the provider protocol extending the syntax to invoke the one or more provider-defined functions via the configuration language to enable the computing infrastructure to call at least one of the one or more of the provider-defined functions for execution by the computing infrastructure, the syntax being extended with one or more remote procedure calls (RPCs), the one or more RPCs being configured to retrieve function definitions and to call function logic of the at least one of the one or more provider-defined functions.

2. The computing infrastructure configuration system in accordance with claim 1, wherein each provider-defined function includes a function definition that can be expressed by a generic mechanism of the configuration language of the configuration tool.

3. The computing infrastructure configuration system in accordance with claim 1, wherein the infrastructure-as-code configuration tool is configured to parse the configuration language for function calls to determine the one or more provider-defined functions, and to validate the one or more provider-defined functions determined from the function calls.

4. The computing infrastructure configuration system in accordance with claim 1, wherein the infrastructure-as-code configuration tool is further configured to query providers, via the provider protocol, for any supported functions when evaluating the functions.

5. The computing infrastructure configuration system in accordance with claim 4, wherein the infrastructure-as-code configuration tool is further configured to invoke at least one of the one or more provider-defined functions based on the configuration.

6. The computing infrastructure configuration system in accordance with claim 1, further comprising a registry for storing documentation of the one or more provider-defined functions.

7. The computing infrastructure configuration system in accordance with claim 6, wherein the documentation of the one or more provider-defined functions includes one or more of a function name, defined inputs and outputs, and a usage description.

8. A computing infrastructure configuration system comprising:
   an infrastructure-as-code configuration tool providing a configuration language that defines the configuration and operation of the computing infrastructure using a declarative syntax, the declarative syntax being configured to express a plurality of built-in functions that can be executed by the computing infrastructure based on the configuration of the computing infrastructure; and
   a syntax extension from the declarative syntax, the syntax extension configured to express one or more provider-defined functions defined by one or more providers, each of the one or more providers connected to the configuration tool by a provider protocol, the provider protocol providing the syntax extension to invoke the one or more provider-defined functions via the configuration language to enable the computing infrastructure to call at least one of the one or more of the provider-defined functions for execution by the computing infrastructure, wherein the syntax extension comprises one or more remote procedure calls (RPCs) to retrieve function definitions and to call function logic of the at least one of the one or more provider-defined functions.

9. The computing infrastructure configuration system in accordance with claim 8, wherein each provider-defined function includes a function definition that can be expressed by a generic mechanism of the configuration language of the configuration tool.

10. The computing infrastructure configuration system in accordance with claim 8, wherein the infrastructure-as-code configuration tool is configured to parse the configuration language for function calls to determine the one or more provider-defined functions, and to validate the one or more provider-defined functions determined from the function calls.

11. The computing infrastructure configuration system in accordance with claim 8, wherein the infrastructure-as-code configuration tool is further configured to query providers, via the provider protocol, for any supported functions when evaluating the functions.

12. The computing infrastructure configuration system in accordance with claim 11, wherein the infrastructure-as-code configuration tool is further configured to invoke at least one of the one or more provider-defined functions based on the configuration.

13. The computing infrastructure configuration system in accordance with claim 8, wherein the infrastructure-as-code configuration tool includes a registry for storing documentation of the one or more provider-defined functions.

14. The method in accordance with claim 13, wherein the documentation of the one or more provider-defined functions includes one or more of a function name, defined inputs and outputs, and a usage description.

15. A method, performed by an infrastructure-as-code configuration tool, for configuring a computing infrastructure, the method comprising:
providing a declarative syntax configured to express a plurality of built-in functions that can be executed by the computing infrastructure based on a configuration of the computing infrastructure; and
providing a syntax extension from the declarative syntax, the syntax extension configured to express one or more provider-defined functions defined by one or more providers, each of the one or more providers connected to the configuration tool by a provider protocol, the provider protocol providing the syntax extension to invoke the one or more provider-defined functions via the configuration language to enable the computing infrastructure to call at least one of the one or more of the provider-defined functions for execution by the computing infrastructure, wherein the syntax extension comprises one or more remote procedure calls (RPCs) to retrieve function definitions and to call function logic of the at least one of the one or more provider-defined functions.

16. The method in accordance with claim 15, wherein each provider-defined function includes a function definition that can be expressed by a generic mechanism of the configuration language of the configuration tool.

17. The method in accordance with claim 15, further comprising parsing the configuration language for function calls to determine the one or more provider-defined functions, to validate the one or more provider-defined functions determined from the function calls.

18. The method in accordance with claim 15, further comprising querying providers, via the provider protocol, for any supported functions when evaluating the functions.

19. The method in accordance with claim 18, wherein the infrastructure-as-code configuration tool is further configured to invoke at least one of the one or more provider-defined functions based on the configuration.

20. The method in accordance with claim 15, further comprising a registry for storing documentation of the one or more provider-defined functions.

21. The computing infrastructure configuration system in accordance with claim 20, wherein the documentation of the one or more provider-defined functions includes one or more of a function name, defined inputs and outputs, and a usage description.

* * * * *